(12) United States Patent
Eck et al.

(10) Patent No.: US 7,578,759 B2
(45) Date of Patent: Aug. 25, 2009

(54) TORQUE LIMITING MECHANISM

(75) Inventors: Brian G Eck, Bemidji, MN (US); Karl M Leisenheimer, Bemidji, MN (US); Dustin W Knutson, Lake Park, MN (US)

(73) Assignee: TEAM Industries, Inc., Bagley, MN (US)

( * ) Notice: Subject to any disclaimer, the term of this patent is extended or adjusted under 35 U.S.C. 154(b) by 707 days.

(21) Appl. No.: 10/931,797

(22) Filed: Sep. 1, 2004

(65) Prior Publication Data

US 2006/0042901 A1    Mar. 2, 2006

(51) Int. Cl.
*F16D 7/02* (2006.01)

(52) U.S. Cl. .................. 474/74; 192/56.6; 464/46; 180/9.64

(58) Field of Classification Search ............ 464/46; 192/56.6; 180/190, 9.62, 9.64; 474/144, 474/70, 73, 74; 74/606 R
See application file for complete search history.

(56) References Cited

U.S. PATENT DOCUMENTS

| | | |
|---|---|---|
| 2,815,632 A | 2/1957 | Dort |
| 3,498,425 A * | 3/1970 | Takada ................ 192/218 |
| 3,600,877 A | 8/1971 | McCreary et al. |
| 3,623,565 A | 11/1971 | Ward et al. |
| 3,747,267 A | 7/1973 | Paulk et al. |
| 4,195,537 A | 4/1980 | Sessler |
| 4,362,524 A * | 12/1982 | Lob et al. ................ 474/88 |
| 4,373,924 A | 2/1983 | Schuhmacher |
| 4,561,529 A | 12/1985 | McIntosh |
| 5,056,302 A | 10/1991 | Rosenbalm et al. |
| 5,172,786 A | 12/1992 | Ishibashi et al. |
| 6,568,519 B2 | 5/2003 | Lovatt |
| 6,569,043 B2 | 5/2003 | Younggren et al. |
| 2001/0008055 A1 | 7/2001 | Sueshige et al. |
| 2002/0017418 A1 | 2/2002 | Korenjack et al. |
| 2003/0032519 A1* | 2/2003 | Lovatt ................ 475/204 |
| 2004/0149508 A1* | 8/2004 | Wildfellner ............ 180/312 |

OTHER PUBLICATIONS

Magazine article and service manual on "Snow Hawk": "Industry Update—AD Boivin Releases 2004 Snow Hawk Line-Up," *SnowTech*, pp. 20-21 (Mar. 2003); and "Secondary Transmission System," pp. 9-1 through 9-9.

* cited by examiner

*Primary Examiner*—Robert A Siconolfi
*Assistant Examiner*—Vu Q Nguyen
(74) *Attorney, Agent, or Firm*—IPLM Group, P.A.

(57) ABSTRACT

Friction plates (53, 67) have a friction surface which contacts a friction surface on reaction plates (54, 68) to limit the torque transferred in a drive train, after the engine, in a snowmobile, while still allowing torque transmission at a predetermined level.

2 Claims, 7 Drawing Sheets

TORQUE LIMITING MECHANISM

BACKGROUND OF THE INVENTION

1. Field of the Invention

This invention relates generally to a drive train of a vehicle, and more particularly to a torque limiting mechanism for use with a drive train of a snowmobile to remove excessive shock loads.

2. Description of the Prior Art

Presently, snowmobiles are subjected to extreme shock loads to the drive line because the snowmobiles are capable of utilizing high horse power and speeds. There is no "circuit breaker" in the system to regulate drive train loads. Belts, clutches, drive shafts and chain failures are common problems in competitive environments.

Figure 1:
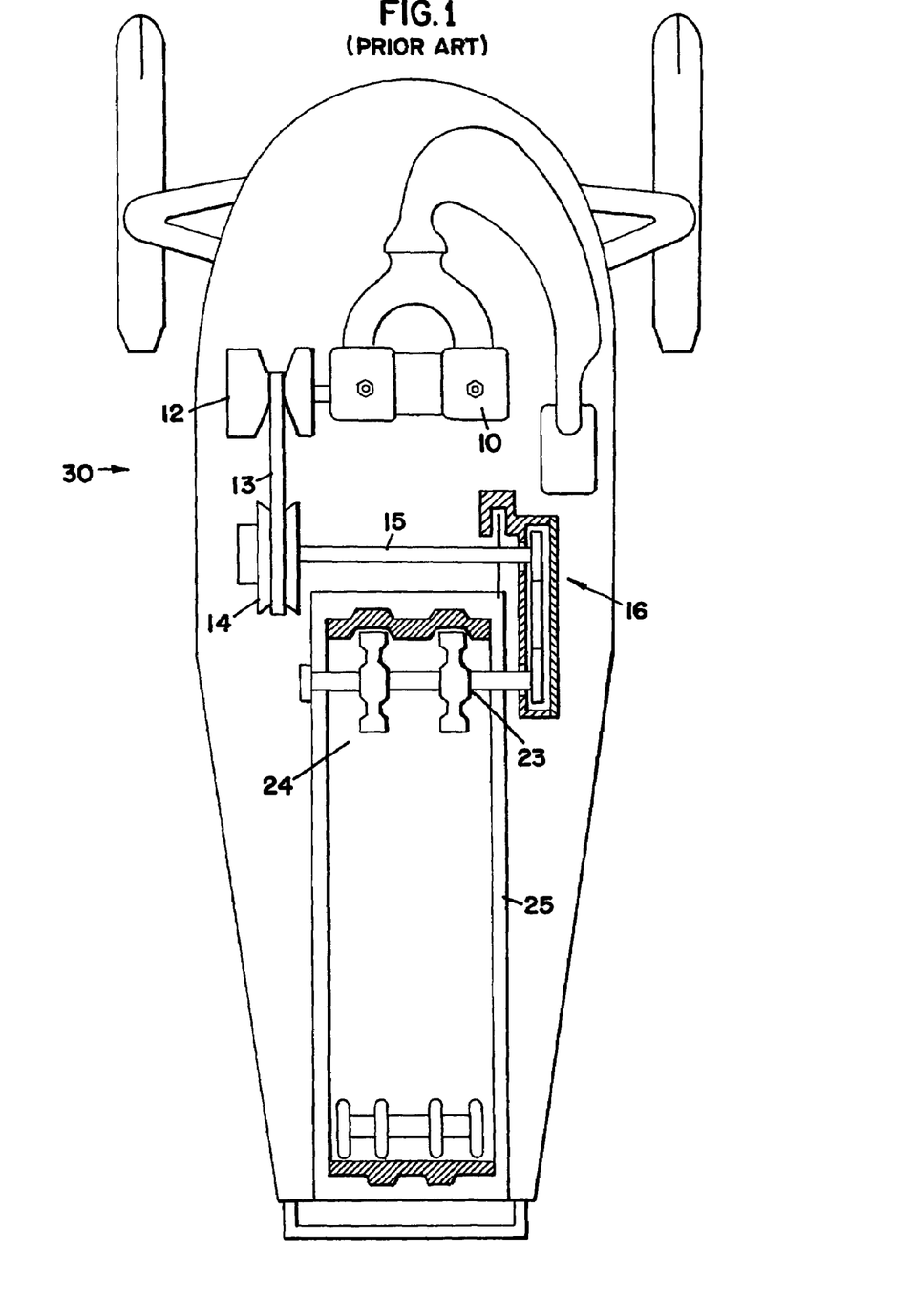
FIG. 1 is a diagrammatical view of a snowmobile, known in the art.
Figure 2:
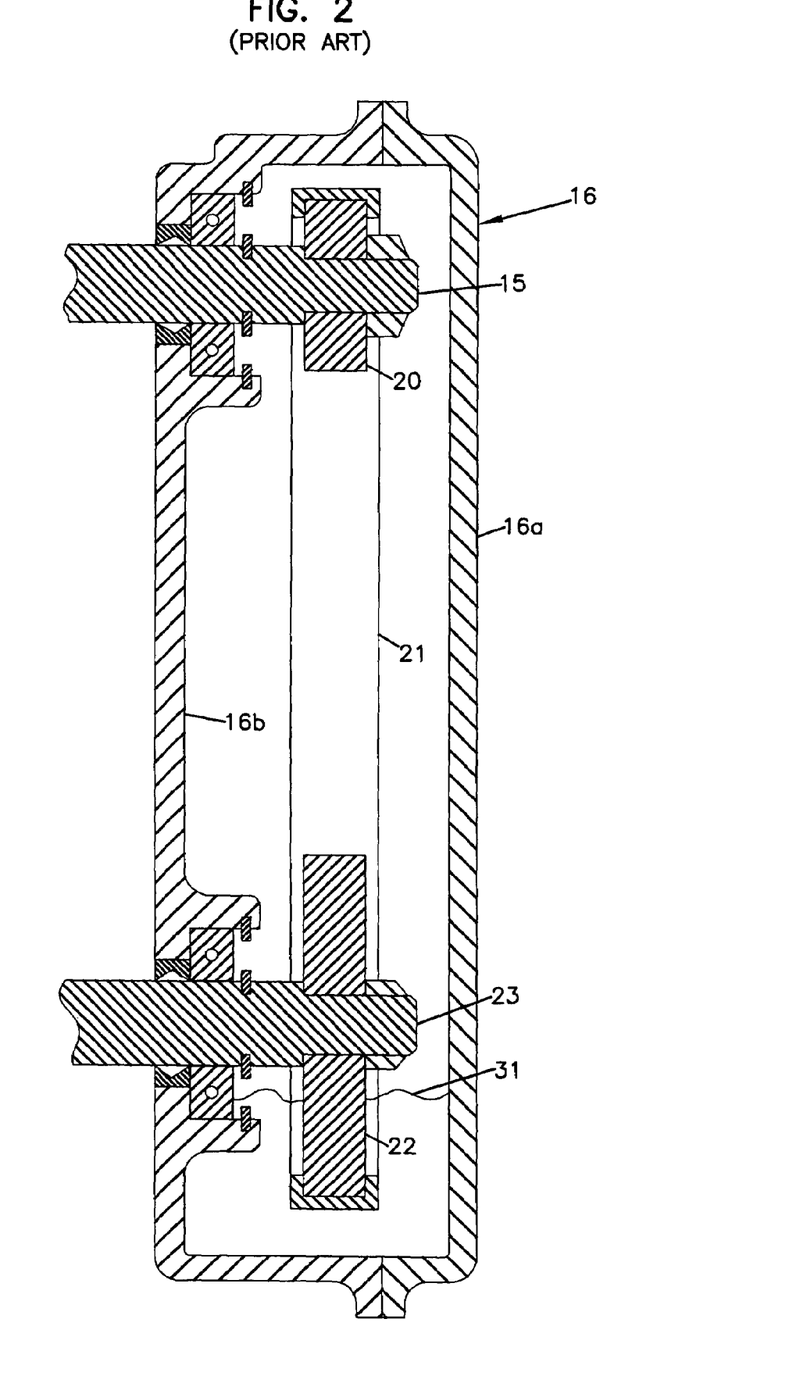
FIG. 2 is a cross-sectional view of the chain case of the snowmobile shown in FIG. 1.

For example, a conventional snowmobile drive train is shown in FIGS. 1 and 2. Torque is generated by the snowmobile engine 10. The torque is transferred to the primary clutch 12 through a taper fit connection. The primary clutch 12 squeezes on the belt 13 which in turn transfers the torque into the secondary clutch 14. The secondary clutch 14 then turns the intermediate or jack shaft 15 by means of a splined or keyed connection. The torque is then transferred inside of the chain case or housing 16 from the jack shaft 15 to the upper sprocket 20 through a spline connection. The chain case assembly 16 includes a cover 16a operatively connected to a case 16b. The upper sprocket 20 turns the chain 21 which then drives the lower sprocket 22. The lower sprocket 22 is splined to the drive shaft 23. The drive shaft 23 then transfers the torque to the track driver lugs 24 through a hex-shaped connection. The track driver lugs 24 then power the track 25 against the ground which in turn powers the snowmobile 30. An exemplary oil level 31 is shown.

The present invention addresses the problems associated with the prior art and provides for a torque limiting mechanism to remove excessive shock loads from a snowmobile drive train.

SUMMARY OF THE INVENTION

In one embodiment, the invention is a drive train assembly in a snowmobile for transferring torque from an engine to a track. The assembly includes an intermediate shaft operatively connected to the engine. A drive chain operatively connects the intermediate shaft to a drive shaft. A track lug driver is operatively connected to the drive shaft, wherein torque is transmitted from the engine to the track lug driver and then the track. A torque limiting mechanism is operatively connected to the drive train assembly after the engine and before the track lug driver. The torque limiting mechanism has a first friction surface in contact with a second friction surface. The first friction surface is operatively connected upstream in the drive train assembly and the second friction surface is operatively connected downstream in the drive train assembly, wherein when the torque exceeds a predetermined value, the friction surfaces slip relative to each other thereby limiting torque transmission as well as still allowing torque transmission at the predetermined level and at a relatively constant level while slipping.

In another embodiment, the invention is a chain case for use with a snowmobile having an intermediate shaft and a drive shaft. The chain case includes a housing having an intermediate shaft opening and a drive shaft opening adapted and configured to receive the intermediate shaft and drive shaft respectively. A first sprocket is adapted and configured to be operatively connected to one of the intermediate shaft and drive shaft. A second sprocket assembly is adapted and configured to be operatively connected to the other of the intermediate shaft and the drive shaft. The second sprocket assembly includes a second sprocket and a first friction surface operatively connected to the second sprocket. A hub is positioned in the second sprocket and a second friction surface is operatively connected to the hub. The first friction surface is in contact with the second friction surface, wherein when the torque exceeds a predetermined value, the friction surfaces slip relative to each other, thereby limiting torque transmission as well as still allowing torque transmission at the predetermined level and at a relatively constant level while slipping.

In another embodiment, the invention is a torque limiting mechanism for use with a drive assembly having a sprocket in a chain case in a snowmobile. The torque limiting mechanism includes a drive shaft adapted and configured to be driven by the sprocket. A first friction surface is operatively connected to the drive shaft. An outer housing is positioned around the drive shaft. A second friction surface is operatively connected to the outer housing. The first friction surface in contact with the second friction surface, wherein when the torque exceeds a predetermined value, the friction surfaces slip relative to each other, thereby limiting torque transmission as well as still allowing torque transmission at the predetermined level and at a relatively constant level while slipping.

In another embodiment, the invention is a drive train assembly in a snowmobile for transferring torque from an engine to a track. The assembly includes a track lug driver operatively connected to the engine, wherein torque is transmitted from the engine to the track lug driver and then the track. The torque limiting mechanism is operatively connected to the drive train assembly after the engine and before the track lug driver. The torque limiting mechanism has a first friction surface that is in contact with a second friction surface. The first friction surface is operatively connected upstream in the drive train assembly and the second friction surface is operatively connected downstream in the drive train assembly, wherein when the torque exceeds a predetermined value, the friction surfaces slip relative to each other, thereby limiting torque transmission as well as allowing torque transmission at the predetermined level and at a relatively constant level while slipping.

In another embodiment, the invention is a torque limiting mechanism for use with a drive train assembly having a torque transferring member in a snowmobile. The torque limiting mechanism includes a drive shaft adapted and configured to be driven by the sprocket. A first friction surface is operatively connected to the drive shaft. An outer housing is positioned around the drive shaft. A second friction surface is operatively connected to the outer housing. The first friction surface is in contact with the second friction surface, wherein when the torque exceeds a predetermined value, the friction surfaces slip relative to each other, thereby limiting torque transmission as well as still allowing torque transmission at the predetermined level and a relatively constant level while slipping.

DETAILED DESCRIPTION OF A PREFERRED EMBODIMENT

Figure 3:
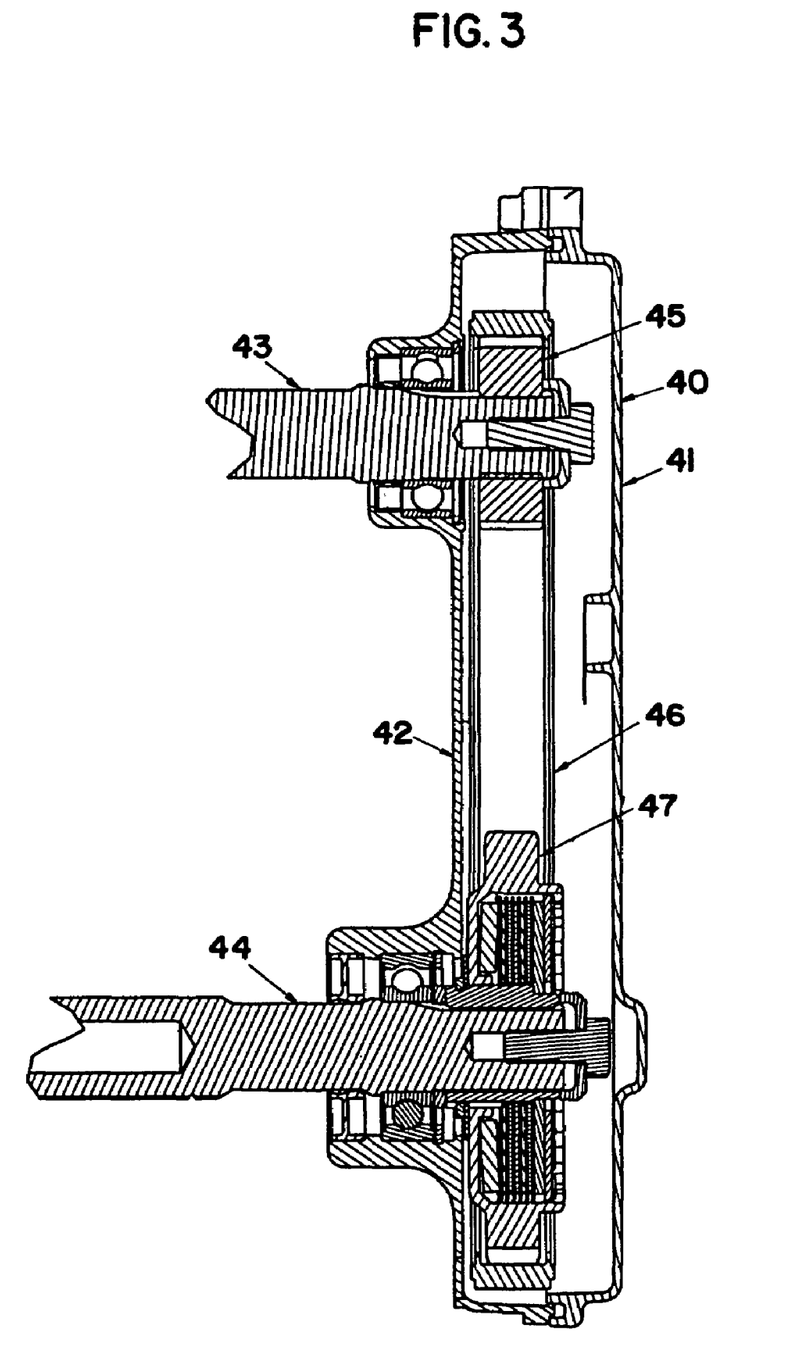
FIG. 3 is a cross-sectional view of a chain case of the present invention.

Referring to the drawings, wherein like numerals represent like parts throughout the several views, there is generally disclosed at 40 a chain case. The chain case 40 utilizes a torque limiting mechanism and is for use in a snowmobile and, for instance, would be utilized in place of the prior art chain case 16 as previously described. The chain case assembly 40 is a housing that includes a cover 41, operatively connected to a case 42. The chain case assembly 40 an opening adapted and configured to receive the intermediate or jack shaft 43. The jack shaft 43 is similar to the jack shaft 15 previously described. In addition, the housing or chain case assembly 40 has an opening adapted and configured to receive the drive shaft 44, which is again similar to the drive shaft 23 previously described. An upper sprocket 45 is operatively connected to the intermediate shaft 43 by suitable means, such as a spline connection, well known in the art. A chain 46 is positioned around the upper sprocket 45. The chain case, thus far described, is well known in the art and any suitable chain case may be utilized.

Figure 4:
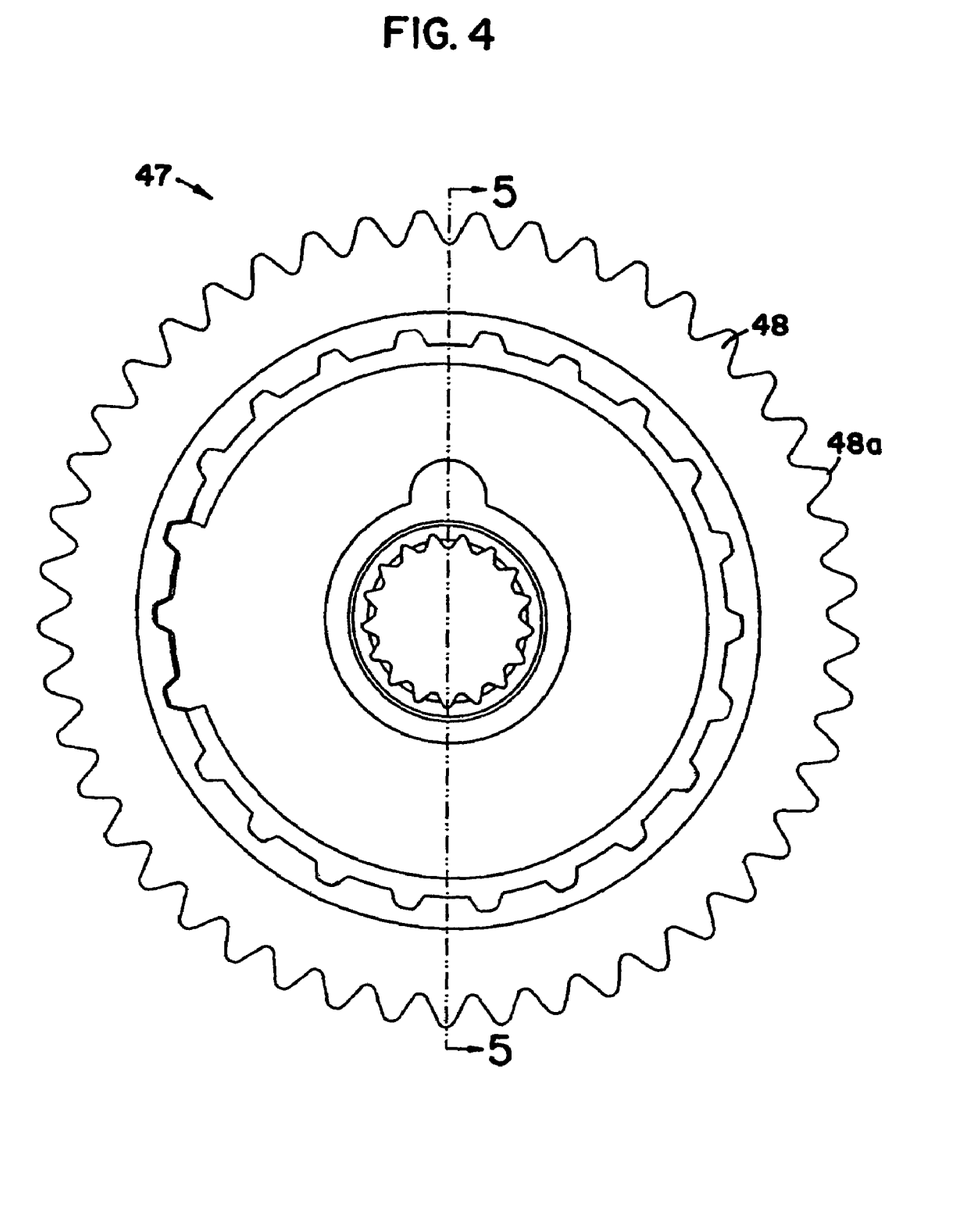
FIG. 4 is a side elevational view of the sprocket assembly shown in FIG. 3.
Figure 5:
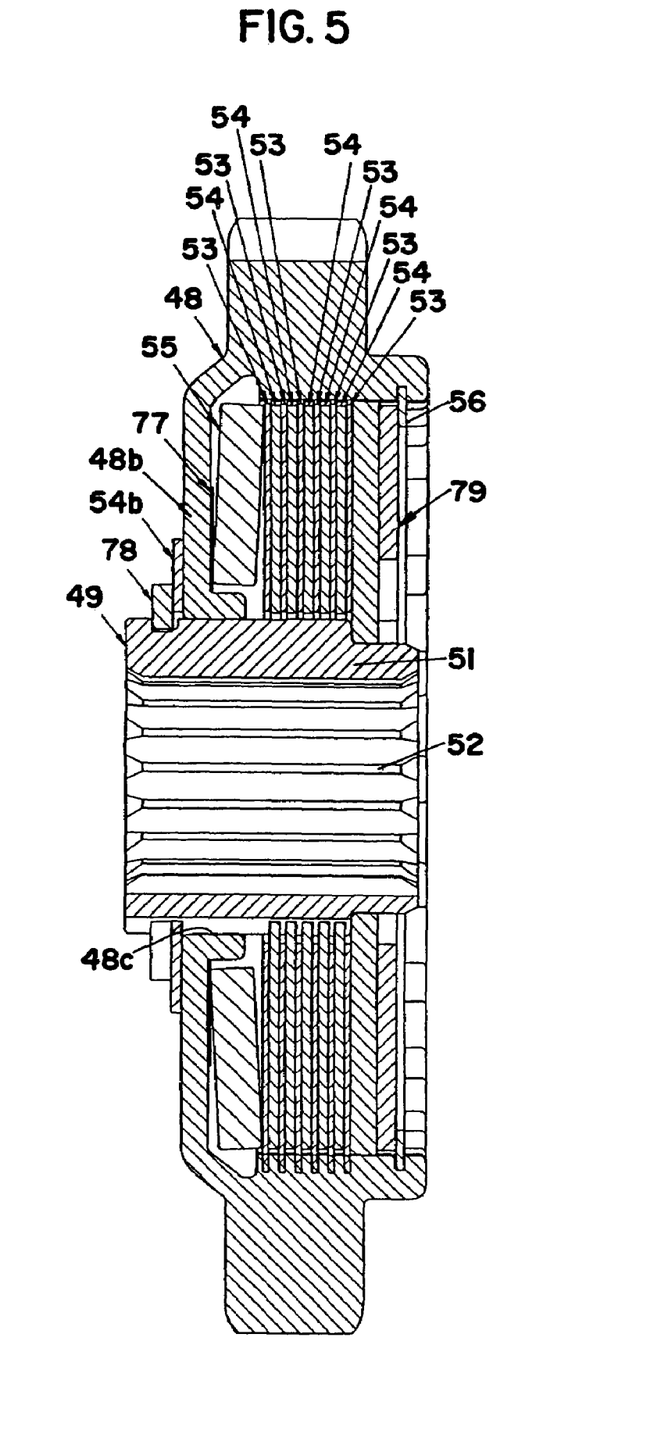
FIG. 5 is a cross-sectional view of the sprocket assembly shown in FIG. 4, taken generally along the lines 5-5.
Figure 6:
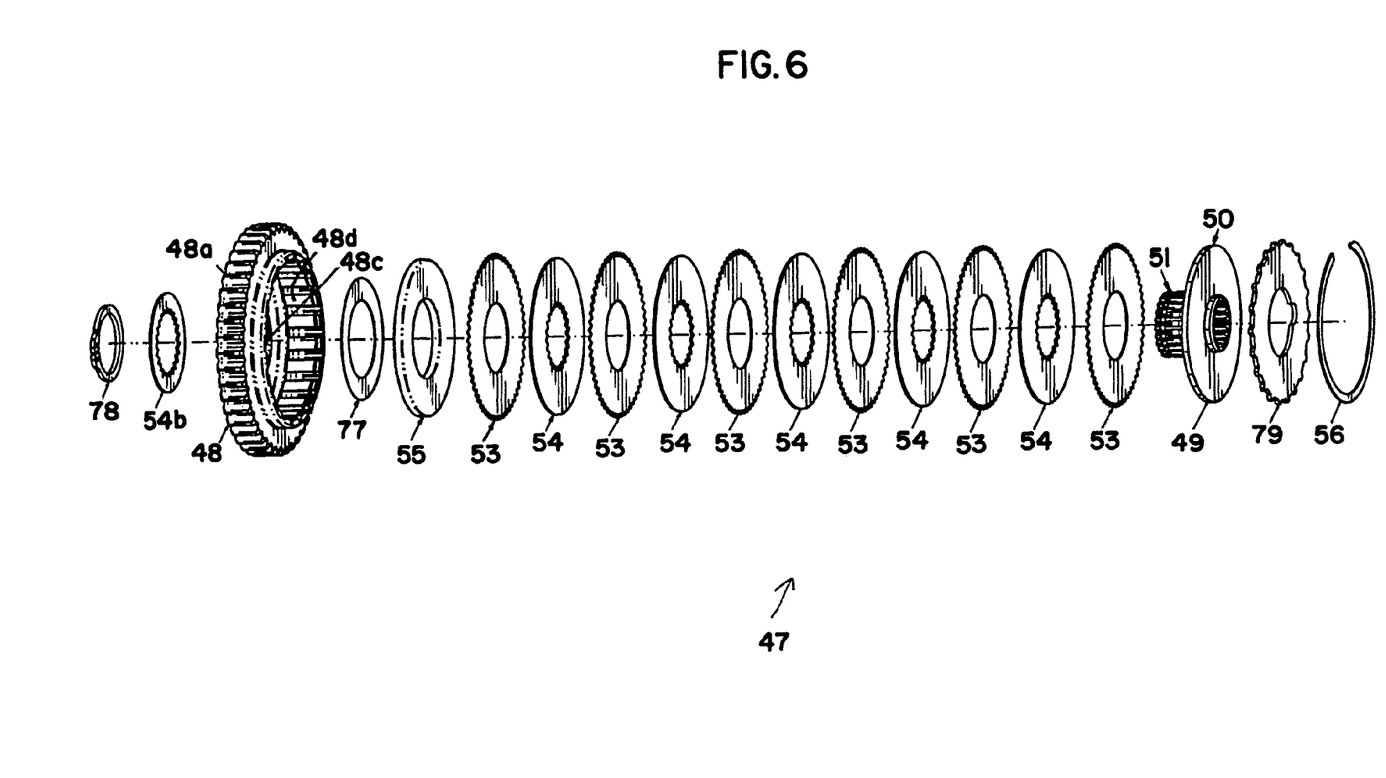
FIG. 6 is an exploded perspective view of the sprocket assembly shown in FIG. 4.

A lower sprocket assembly 47, as seen in more detail in FIGS. 4-6, is operatively connected to the drive shaft 44 by suitable means such as a spline connection. The lower sprocket assembly 47 includes a lower sprocket 48 that has a plurality of teeth 48a formed around its outer circumference. The teeth 48a are adapted and configured to engage the chain 46, as is the upper sprocket 45. The lower sprocket 48 has a side 48b that has an opening 48c formed therein. The opening 48c is sized and configured to receive a hub 49. The hub 49 is sized and configured to fit inside of the cavity 48d of the lower sprocket 48. The hub 49 includes a disc 50 and a splined cylinder 51. The splined cylinder 51 has a central opening around which a plurality of splines 52 are formed. The splines 52 are adapted and configured to mate with the corresponding splines on the drive shaft 44, as is well known in the art. A plurality of friction plates 53 have a spline connection to the lower sprocket 48. The friction plates 53 have two planar sides which each are a friction surface. Also, a plurality of reaction plates 54 have a splined connection with the cylinder 51 of the hub 49. Each of the reaction plates 54 have two planar sides and each of the sides form a friction surface. The reaction plates 54 and friction plates 53 alternate, except proximate the disc 50 where there is a reaction plate 53 on each side of the disc 50. A belleville washer 55 is positioned proximate the side 48b and the last reaction plate 54b. The last reaction plate 54b is similar to the other reaction plates 54 except the last reaction plate 54b is sized to be thicker. It has been found that there has been additional wear on the outer reaction plate 54b, so the last reaction plate 54b has been designed to be thicker for improved stability and to reduce wear. The force exerted against the friction plates 53 and reaction plate 54 from the belleville washer 55 allows for torque transmission through the faces of the friction plates 53 into the reaction plates 54. This allows the sprocket 48 to rotate along with the friction plates 53. A shim 77 may be utilized between the belleville washer 55 and the last reaction plate 54b to provide for adjustability of torque. An outer plate 79 is positioned around the cylinder 51 proximate the internal side of the disk 50. An external retaining ring 78 and an internal retaining ring 56 complete the lower sprocket assembly 47. The external snap ring 78 is redundant and is a safety feature in case the internal retaining ring 56 becomes dislodged. The external snap ring 78 is a back-up safety feature as well as helping to keep the pack of friction plates and reaction plates squared up.

In use, if there is an excessive shock load, the torque transmission between the friction plates 53 and the reaction plates 54 will be overcome causing the friction plate 53 faces to slip against the reaction plate 54 faces. This allows the sprocket 48 to rotate along with the friction plates 53. A desired torque will be maintained as slipping occurs until the torque load drops below a desired torque. After this occurs, the torque transmission without slipping will be reestablished.

While the foregoing has described the sprocket assembly 47 as being a lower sprocket assembly, it is understood that the sprocket assembly may also be utilized on the upper sprocket and then a standard sprocket being used on the lower sprocket. In that case, the torque limiting mechanism of the friction plates and reaction plates would be in the sprocket being driven by the intermediate shaft.

Figure 7:
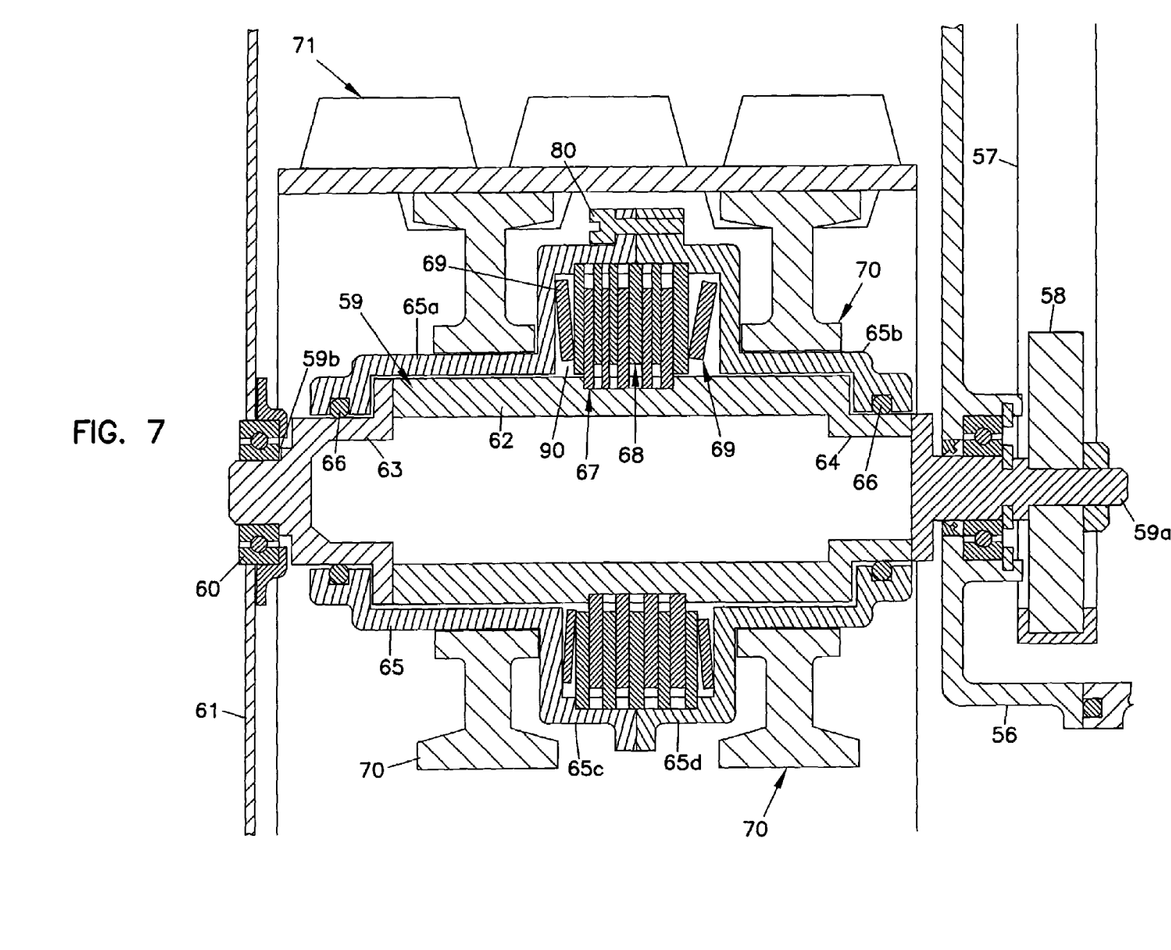
FIG. 7 is a cross-sectional view of another embodiment of a torque limiting mechanism according to the present invention.

Referring now to FIG. 7, there is another embodiment of the torque limiting mechanism of the present invention. In this embodiment, the torque limiting mechanism is utilized with the drive shaft. FIG. 7 shows a typical chain case 56 that utilizes a chain 57 and lower sprocket 58. The chain case 56 may be any suitable chain case as long as the chain case 56 has an opening to receive and is adapted and configured to drive a drive shaft 59. The drive shaft 59 has a first end 59a that is adapted and configured to be driven by the sprocket 58 by suitable means such as a spline connection. A second end 59b is supported by a bearing 60 that is suitably mounted on to a support frame 61. The drive shaft 59 includes a cylindrical housing that includes a first cylindrical portion 62 operatively connected to a second cylindrical portion 63, which is in turn operatively connected to the second end 59b. A third cylindrical portion 64 is operatively connected to the first cylindrical portion 62 at one end and at the other end to the first end 59a of the drive shaft 59. An outer housing 65 is positioned around the drive shaft 59. The outer housing 65 is able to revolve around the drive shaft 59. One configuration for the outer housing 65 is for the outer housing 65 to be made of two generally cylindrical sections 65a, 65b. The sections 65a, 65b may be held together by suitable means such as a bolt 80. Each of the sections 65a, 65b have a wider cylindrical portion 65c, 65d that form a cavity 90. The outer housing 65 is supported on each end by sealed piloting diameters to maintain concentricity between the drive shaft 59 and housing 65. There is a sealed connection using O-ring 66 to allow for a small oil bath sump to provide lubrication to internal components. The first section 65a is actually a mirror image of section 65b and made together and are fastened at their connection.

In the cavity 90, a plurality of friction plates 67 have a splined or other suitable keyed connection to the drive shaft 59. Each of the friction plates 67 have two planar side surfaces that form friction surfaces. A plurality of reaction plates 68 are similarly suitably connected to the outer housing 65 by a keyed or splined connection. The reaction plates 68 have two planar side surfaces that also form friction surfaces. The friction plates 67 and reaction plates 68 are alternated. Two belleville washers 69 are positioned at the sides of the cavity 90 to provide for a force to compress the friction plates 67 against the reaction plates 68.

Track driver lugs or sprockets 70 are pressed on each end of the outer housing 65 and are fixed by a suitable splined or interlocking connection, well known in the art. Torque is passed from the outer housing 65 into the track driver lugs 70 through this connection. Torque is then transmitted from the track driver lugs 70 into the drive track 71 through a typical interlocking connection. The drive track 71 then meets the ground and in turn propels the snowmobile.

The torque limiting mechanism of this embodiment is similar to the previously described embodiment in that when the torque exceeds a given level, the coefficient of friction at the connection between the friction plates 67 and reaction plates 68 will be overcome and slipping will occur between the faces. This will limit or regulate the torque that is capable of then being transferred through the rest of the system.

The foregoing describes two embodiments of a torque limiting mechanism for use in a snowmobile. The torque limiting mechanism is utilized after the engine and uses friction surfaces to transfer the torque. By doing so, torque is able to be transferred up to a predetermined amount, at which time the friction surfaces begin to slip, thereby limiting the amount of torque. However, during this slippage, torque is still continued to be transmitted through the drive train. The present invention is able to transmit the desired torque without ratcheting or fluctuation. The invention delivers relatively constant torque during slipping. This also results in less noise and vibration in the drive train. In each embodiment, the friction plate is upstream of the reaction plate in the drive train. That is, the friction plate is operatively connected to the engine output and the reaction plate is operatively connected to track driver lugs.

In addition, it is also envisioned that the present invention may be used with the new direct drive systems which have just begun being used with snowmobiles. In the direct drive system, the jack shaft and chain case are eliminated. The drive train goes from the engine through the secondary clutch to a gear box to a drive shaft and then to the track lug driver. It is envisioned that the present invention may also be used with such a system. In fact, the embodiment shown in FIG. 7 would also be able to be utilized. As previously stated, the direct drive system does not have a chain case. Accordingly, the first end 59a of the drive shaft 59 would be driven by the output of the gear box, as opposed to the sprocket 58.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A drive train assembly in a snowmobile for transferring torque from an engine to a track;
   a) an intermediate shaft operatively connected to the engine;
   b) a drive shaft operatively connected to the intermediate shaft;
   c) the drive shaft having an outer housing, the outer housing rotatable with the drive shaft;
   d) a track lug driver operatively connected to the drive shaft, wherein torque is transmitted from the engine to the track lug driver and then the track; and
   e) a torque limiting mechanism operatively connected to the drive train assembly between the drive shaft and the track lug driver, the torque limiting mechanism having a first plate having a first friction surface in contact with a second plate having a second friction surface, the first friction surface operatively connected upstream in the drive train assembly and the second friction surface operatively connected downstream in the drive train assembly;
   f) the first friction plate operatively connected to the drive shaft and the second friction plate operatively connected to the outer housing;
   g) a seal between the drive shaft and outer housing, wherein the torque limiting mechanism is an oil bath and is rotatable with the drive shaft;
   h) the drive shaft and outer housing being torque carrying members;
   i) a spring positioned proximate the plates allowing torque transmission through the plates, wherein when the torque exceeds a predetermined value, the friction surfaces slip relative to each other, thereby limiting torque transmission as well as still allowing torque transmission at the predetermined level and at a relatively constant level while slipping; and
   j) track lug drivers operatively connected to the outer housing, wherein the track lug drivers propel the track.

2. The drive train assembly of claim 1, wherein the outer housing is cylindrical.

* * * * *

UNITED STATES PATENT AND TRADEMARK OFFICE
CERTIFICATE OF CORRECTION

PATENT NO.        : 7,578,759 B2                                    Page 1 of 1
APPLICATION NO. : 10/931797
DATED             : August 25, 2009
INVENTOR(S)       : Eck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Seventh Day of September, 2010

David J. Kappos
*Director of the United States Patent and Trademark Office*